(12) United States Patent
Chahl et al.

(10) Patent No.: US 7,593,794 B2
(45) Date of Patent: Sep. 22, 2009

(54) OPTICAL STABILIZATION SYSTEM

(75) Inventors: Javaan Singh Chahl, Curtin (AU);
Friedrich Gert Stange, Holder (AU);
Naig Le Bouffant, Pleumeur-Bodou (FR)

(73) Assignees: The Commonwealth of Australia, Edinburgh (AU); The Australian National University, Canberra (AU)

( * ) Notice: Subject to any disclaimer, the term of this patent is extended or adjusted under 35 U.S.C. 154(b) by 437 days.

(21) Appl. No.: 10/521,676

(22) PCT Filed: Jul. 18, 2003

(86) PCT No.: PCT/AU03/00915
§ 371 (c)(1),
(2), (4) Date: Sep. 12, 2005

(87) PCT Pub. No.: WO2004/010236
PCT Pub. Date: Jan. 29, 2004

(65) Prior Publication Data
US 2006/0095168 A1    May 4, 2006

(30) Foreign Application Priority Data
Jul. 19, 2002    (AU) .............................. 2002950271

(51) Int. Cl.
*G01S 15/00* (2006.01)
(52) U.S. Cl. ............................................. 701/13; 244/3
(58) Field of Classification Search .................. 701/13,
701/226; 244/3.16, 3.18, 164, 189; 250/206.1,
250/372, 203.3, 342, 349, 231.12, 347; 342/61;
318/16, 640, 649
See application file for complete search history.

(56) References Cited

U.S. PATENT DOCUMENTS

| | | | | |
|---|---|---|---|---|
| 2,740,961 | A | * | 4/1956 | Slater .......................... 342/61 |
| 3,119,018 | A | | 1/1964 | Astheimer et al. |
| 3,162,764 | A | | 12/1964 | Haviland |
| 4,483,080 | A | * | 11/1984 | Knoll .......................... 33/286 |
| 4,628,206 | A | | 12/1986 | Astheimer |
| 5,079,419 | A | | 1/1992 | Falbel |
| 5,168,152 | A | | 12/1992 | Kelley |
| 5,319,969 | A | * | 6/1994 | Billing-Ross et al. ..... 73/178 R |
| 5,719,567 | A | | 2/1998 | Norris |

OTHER PUBLICATIONS

Osorio, D. (1986). "Ultraviolet Sensitivity and Spectral Opponency in the Locust," *J. Exp. Biology* 122:193-208.

(Continued)

*Primary Examiner*—Dalena Tran
(74) *Attorney, Agent, or Firm*—Morrison & Foerster LLP

(57) ABSTRACT

A method and apparatus are described for controlling the attitude of a vehicle in a space having at least two opposed viewable regions, each region being viewed by a respective first sensor for sensing a first frequency band of electromagnetic radiation and a respective second sensor for sensing a second frequency band of electromagnetic radiation, wherein respective first and second data sets from the first and second sensors for each regions are produced, these second data sets are subsequently modified and combined with the first data sets to form respective third data sets for each region. The attitude of the vehicle is then adjusted until the third data sets are substantially equal.

43 Claims, 7 Drawing Sheets

OTHER PUBLICATIONS

Stange, G. et al. (1979). "An Ocellar Dorsal Light Response in a Dragonfly," *J. Exp. Biology* 83:351-355.

Taylor, C.P. (1981). "Contribution of Compound Eyes and Ocelli to Steering of Locusts in Flight: I. Behavioural Analysis," *J. Exp. Biology* 93:1-18.

Taylor, C.P. (1981). "Contribution of Compound Eyes and Ocelli to Steering of Locusts in Flight: II. Timing Changes in Flight Motor Units," *J. Exp. Biology* 93:19-31.

* cited by examiner

OPTICAL STABILIZATION SYSTEM

TECHNICAL FIELD

This invention relates to controlling the attitude of a vehicle, particularly an aircraft, using external sensors such as electromagnetic radiation sensors.

BACKGROUND OF THE INVENTION

Controlling the attitude of a vehicle is an important component of any autopilot or similar control system that acts both to sense and maintain the orientation of a vehicle according to user-defined conditions. Typically an Inertial Measurement Unit (IMU) is employed as a key component of any such control system. These devices rely on measurements of changes in the inertial characteristics of a vehicle to determine the vehicle's orientation. However, IMU's suffer from a number of disadvantages. An IMU typically requires a number of individual sensors to be operating, some of which can include rapidly moving parts, in order to provide sensible information on vehicle attitude. Each of these sensors requires its own detailed calibration and tuning and as a consequence IMU's are relatively expensive devices to purchase and maintain.

Another inherent disadvantage of IMU type systems occurs when a vehicle is subjected to violent turbulence and therefore is rapidly maneuvering. In these conditions it becomes increasingly difficult to distinguish the direction of the gravity vector and hence direction from externally imposed accelerations including centripetal accelerations. These types of conditions become more pronounced as the size of the vehicle reduces and hence aircraft such as Unmanned Aerial Vehicles (UAV) require more sophisticated and ruggedised IMU's to compensate for these effects. As would be expected these higher performance IMU's add a significant cost penalty.

One attempt to provide a system that corrects attitude for an UAV which does not require an IMU is described in U.S. Pat. No. 5,168,152 entitled "Attitude Control with Sensors of a Mining Vehicle". This document describes a control system for a vehicle which includes Ultra-Violet (UV) light sensors positioned on the vehicle. These sensors are connected together to produce a signal which is a function of the attitude of the vehicle. This signal is then compared with a command attitude signal to produce a difference signal which is a measure of the difference between the attitude of the vehicle and the attitude determined by the command attitude signal.

The principle behind this and similar attitude control systems can be readily explained by reference to FIGS. 1(a) and (b) which depict top and front views of an aircraft 10 including a left looking radiation sensor 1 and its associated field of view and a forward looking radiation sensor 2 and its respective field of view. Similarly, there is shown a right looking sensor 3 and an aft looking sensor 4. In the vertical plane the radiation sensors are arranged to look outwards with the centre of the field of view aligned with the horizon as shown in FIG. 1(a). FIG. 1(b) shows the alignment and representative size of the lateral fields of view 6, 7 corresponding to the right looking sensor 3 and left looking sensor 1 respectively.

Referring now to FIGS. 2(a), (b) and (c), aircraft 10 including radiation sensors as shown in FIGS. 1(a) and (b) is depicted flying towards the observer out of the page. Lateral fields of view 6 and 7 are also shown. Also to the left and right of aircraft 10 are representations of the expected positions of the horizon which directly relate to measured radiation sensor intensity. FIG. 2(a) illustrates left 30 and right 20 lateral views as would be expected as aircraft 10 rolls left. Similarly FIG. 2(b) indicates the left 31 and right 21 lateral views when aircraft 10 rolls right. Clearly the lateral sensor in the direction of roll will sense more "dark" ground and hence have a lower output. When aircraft 10 is not experiencing any roll as shown in FIG. 2(c) the left 32 and right 22 views are substantially equivalent resulting in equivalent intensities being measured by each sensor.

Thus output from the lateral radiation sensors may be used to give an indication of roll and furthermore appropriate control signals can be applied to controlling elements of the aircraft to cause it to orient itself so as to equalise the light intensities on either side of the aircraft 10. The same principle may be applied to the pitch axis, by incorporating measurements from longitudinal fore 2 and 4 aft radiation sensors. By balancing the measured output from these sensors the pitch of aircraft 10 can be reduced to level. Clearly the combination of lateral and longitudinal looking radiation sensors would allow full stabilization of attitude in pitch and roll.

As described in U.S. Pat. No. 5,168,152 typically UV sensors are used. This is due to the increased contrast in intensity between the sky and the ground at wavelengths ranging from blue (450 nm) to UV. This can be compared to measurements in the green to red part of the electromagnetic spectrum, where radiation emanated from these regions is of approximate equal intensity. Interestingly, for wavelengths in the near infrared (800 nm) and extending into the millimetre wave band, where the ground appears warm and intense and the sky appears cold and dark, similar contrasts in measured intensity may be measured.

The approach of using UV or single band radiation sensors suffers from a serious disadvantage which can be readily appreciated by reference to FIG. 3 which depicts aircraft 10 and representations of the lateral views of radiation sensors similar to that depicted in FIG. 2. In this example left lateral view 30 includes the sun, which is a significant source of UV radiation. This increases the overall intensity measured by the left viewing sensor of this region of sky with the net effect that in order to balance this, the aircraft will adjust roll so that right radiation sensor will measure an equal intensity thus causing the aircraft to roll left. Effectively, the sun is applying a bias to any roll calculation. This is shown schematically in FIG. 3 where the roll command function 50 is directly related to the difference 40 between left and right sensors having left 7 and right 6 lateral fields of view. Given the approximately 2° angular sub tense of the sun, roll errors of up to 60° are expected for systems employing measurements in the UV wavelength range. Obviously, the exact same problem will occur in the pitch axis for fore and aft radiation sensors.

One attempt to address this significant problem of attitude bias relies on the fact that the difference in brightness between the sun and the surrounding sky is dependent on wavelength and ranges from a factor of 10 in millimetre wave bands, 100 in thermal bands, to 1000 in visible bands. Thus the effect of attitude bias introduced by the sun can be mitigated somewhat to approximately 20° by employing thermal band sensors or down to 6.5° for millimetre wave measurements. However, at different wavelengths cloud cover will have a more pronounced effect also appearing as an electromagnetic source and resulting in another potential source of error causing an attitude biasing effect similar to that of the sun.

Another means to attempt to address attitude bias is to narrow the field of view of the radiation sensor to reduce the effect. However, this leads to an attitude control system having less capability to recover from unusual attitudes, and also more prone to biases due to local horizon deformations (such as trees), and obviously catastrophic failure if the sun should fall within the field of view of any of the radiation sensors.

It is therefore an object of the invention to provide a method and apparatus which improves the performance of attitude stabilisation systems which employ radiation sensors.

SUMMARY OF THE INVENTION

In a first aspect the present invention accordingly provides a method for controlling an attitude of a vehicle in a space having at least two opposed viewable regions about said vehicle, each region being viewed by a respective first sensor for sensing a first frequency band of electromagnetic radiation and a respective second sensor for sensing a second frequency band of electromagnetic radiation, said method including the steps of:

a) producing a first data set from said first sensor viewing a first of said regions;
b) producing a second data set from said second sensor viewing said first region;
c) modifying said second data set;
d) combining the result of said modifying step with said first data set to form a third data set for said first region;
e) repeating steps a) to d) for a second set of first and second sensors viewing an opposed viewable region; and
f) adjusting the attitude of said vehicle until respective said third data sets for each opposed viewable region are substantially equal;

Preferably said steps of modifying and combining reduce a bias introduced by a source of electromagnetic radiation in a viewable region. Clearly, this addresses an important disadvantage of prior art methods wherein introduced attitude biases are not effectively compensated for.

Preferably said first frequency band of electromagnetic radiation is in the ultraviolet frequencies and said second frequency band is in the green spectra frequencies and the source of electromagnetic radiation is the sun. As the sun is one of the most common causes of attitude bias, a system embodying this method will have improved performance over prior art systems.

In a second aspect the present invention accordingly provides a method for calculating the attitude of a vehicle in a space having a viewable region, said region being viewed by a first and second pair of sensors, each of first and second pair including a first sensor for sensing a first frequency band of electromagnetic radiation and a second sensor for sensing a second frequency band of electromagnetic radiation, said first pair of sensors being tilted a first predetermined angle to view a first sub-region substantially above and including a horizon, and said second pair of sensors being tilted a second predetermined angle to view a second sub-region substantially below and including the horizon; the method including the steps of:

a) producing a first data set from said first sensor of said first pair;
b) producing a second data set from said second sensor of said first pair;
c) modifying said second data set;
d) combining the result of said modifying step with said first data set to form a third data set for said first pair;
e) repeating steps a) to d) for said first and second sensors of said second pair;
f) determining a relationship between a change in intensity between said third data sets and said vehicle attitude; and
g) calculating said vehicle attitude from said relationship.

In a third aspect the present invention accordingly provides a method for reducing the effects of a source of electromagnetic radiation when viewing a region to detect variations in background intensity in said region, said method including the steps of:

a) producing a first data set from a first sensor viewing said region in a first frequency band;
b) producing a second data set from a second sensor viewing said region in said second frequency band;
c) modifying said second data set; and
d) combining the result of said modifying step with said first data set to form a third data set for said region, said third data set containing data wherein said effects of said electromagnetic source are substantially reduced relative to said variations in background intensity.

In a fourth aspect the present invention accordingly provides an apparatus for controlling an attitude of a vehicle in a space having at least two opposed viewable regions about said vehicle, said apparatus including for viewing each region, a respective first sensor for sensing a first frequency band of electromagnetic radiation and a respective second sensor for sensing a second frequency band of electromagnetic radiation, said apparatus further including:

a) respective first data capture means for producing first data sets from said first sensors viewing each of said regions;
b) respective second data capture means for producing second data sets from said second sensors viewing each of said regions;
c) respective first processor means for modifying each of said second data sets;
d) respective second processor means for combining the results of each of said first processor means with said first data sets to form respective third data sets for each of said regions; and
e) control signal generation means for generating a control signal to adjust the attitude of said vehicle until respective said third data sets for each opposed viewable region are substantially equal.

In a fifth aspect the present invention accordingly provides an apparatus for calculating the attitude of a vehicle in a space having a viewable region, said apparatus including for viewing said region, a first and second pair of sensors, each of first and second pair including a first sensor for sensing a first frequency band of electromagnetic radiation and a second sensor for sensing a second frequency band of electromagnetic radiation, said first pair of sensors adapted to be tilted a first predetermined angle to view a first sub-region substantially above and including a horizon, and said second pair of sensors adapted to be tilted a second predetermined angle to view a second sub-region substantially below and including the horizon; said apparatus further including:

a) respective first data capture means for producing respective first data sets from said first sensors of each pair;
b) respective second data capture means producing second data sets from said second sensors of each first pair;
c) respective first processor means for modifying each of said second data sets;
d) respective second processor means for combining the results of each of said first processor means with said first data sets to form respective third data sets for each pair of sensors;
e) third processor means for determining a relationship between change in intensity between said third data sets and vehicle attitude; and
f) calculating means to calculate said vehicle attitude according to said relationship.

In a sixth aspect the present invention accordingly provides an apparatus for reducing the effects of a source of electromagnetic radiation when viewing a region to detect variations in background intensity in said region, said apparatus including:
a) first data capture means for producing a first data set from a first sensor viewing said region in a first frequency band;
b) second data capture means for producing a second data set from a second sensor viewing said region in said second frequency band;
c) first processor means for modifying said second data set;
d) second processor means for combining the result of said first data processor means with said first data set to form a third data set for said region, said third data set containing data wherein said effects of said electromagnetic source are substantially reduced relative to said variations in background intensity.

In a seventh aspect the present invention accordingly provides a method for controlling an attitude of a vehicle said method including the steps of:
a) taking a first measurement in a first spectral band;
b) taking a second measurement in a second spectral band;
c) processing at least one of said first and second measurements with respect to each other;
d) producing a control signal as a result of said processing step to control said attitude of said vehicle;

In an eighth aspect the present invention accordingly provides an apparatus for controlling an attitude of a vehicle said apparatus including:
a) a first sensor for taking a first measurement in a first spectral band;
b) a second sensor for taking a second measurement in a second spectral band;
c) a processor for processing at least one of said first and second measurements with respect to each other;
d) control signal generator responsive to said processor for producing a control signal to control said attitude of said vehicle;

BRIEF DESCRIPTION OF THE DRAWINGS

The invention will now be described with reference to the following drawings in which.

DETAILED DESCRIPTION OF THE PREFERRED EMBODIMENT

Figure 1A:
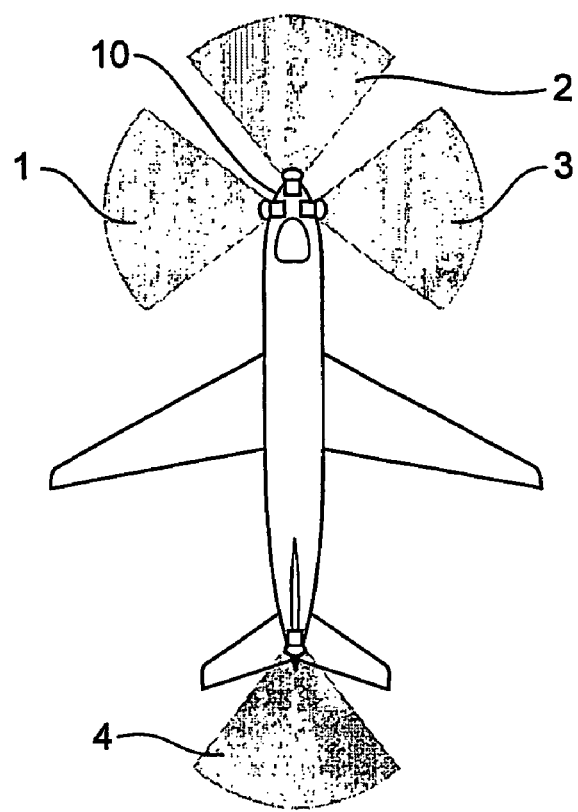
FIGS. 1(a) and (b) show a prior art arrangement of sensors on an aircraft.
Figure 1B:
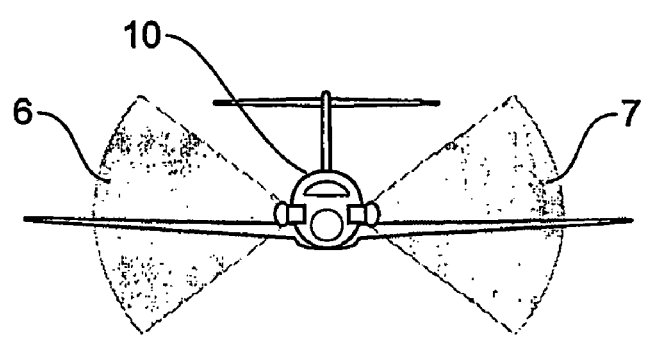
Figure 2A:
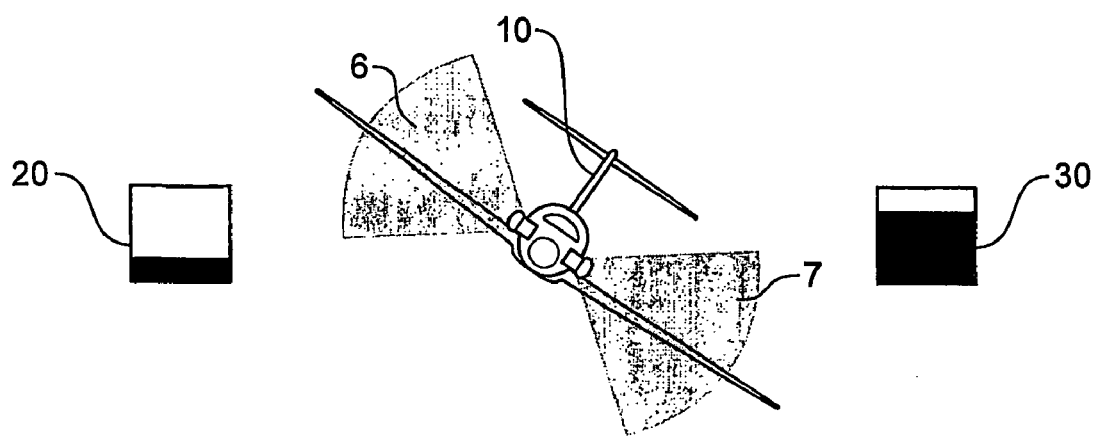
FIGS. 2(a), (b) and (c) show a prior art use of the sensors to control the attitude of an aircraft.
Figure 2B:
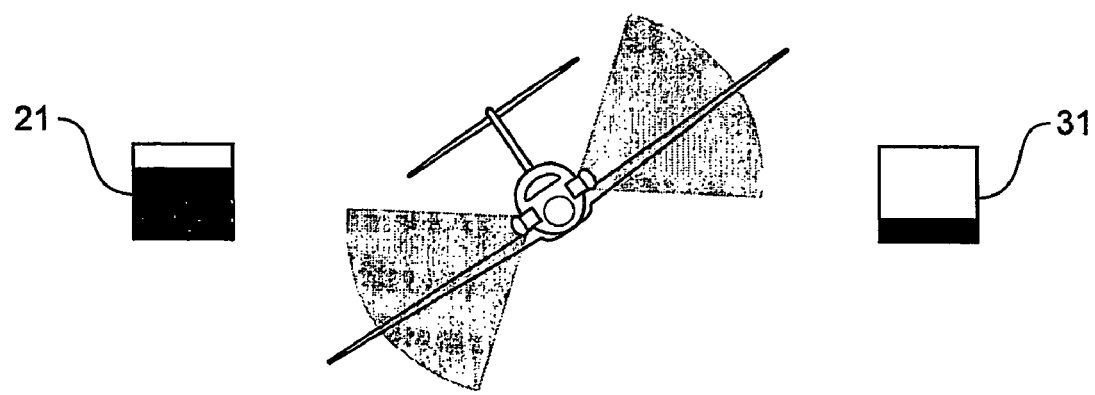
Figure 2C:
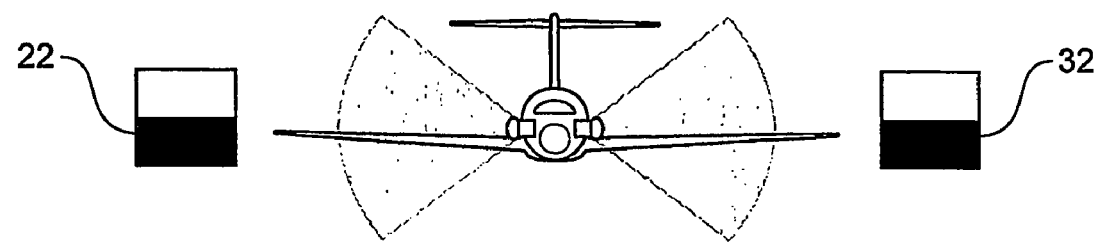
Figure 3:
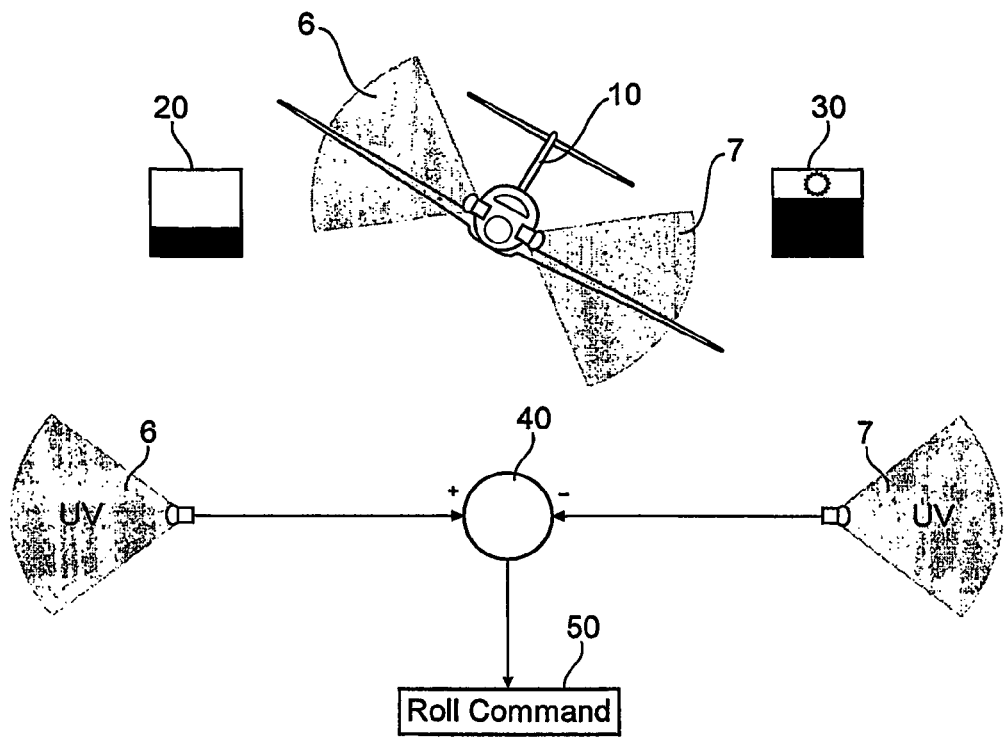
FIG. 3 shows the situation in which the sun is present in the field of view of the sensors and the introduced attitude bias.
Figure 4:
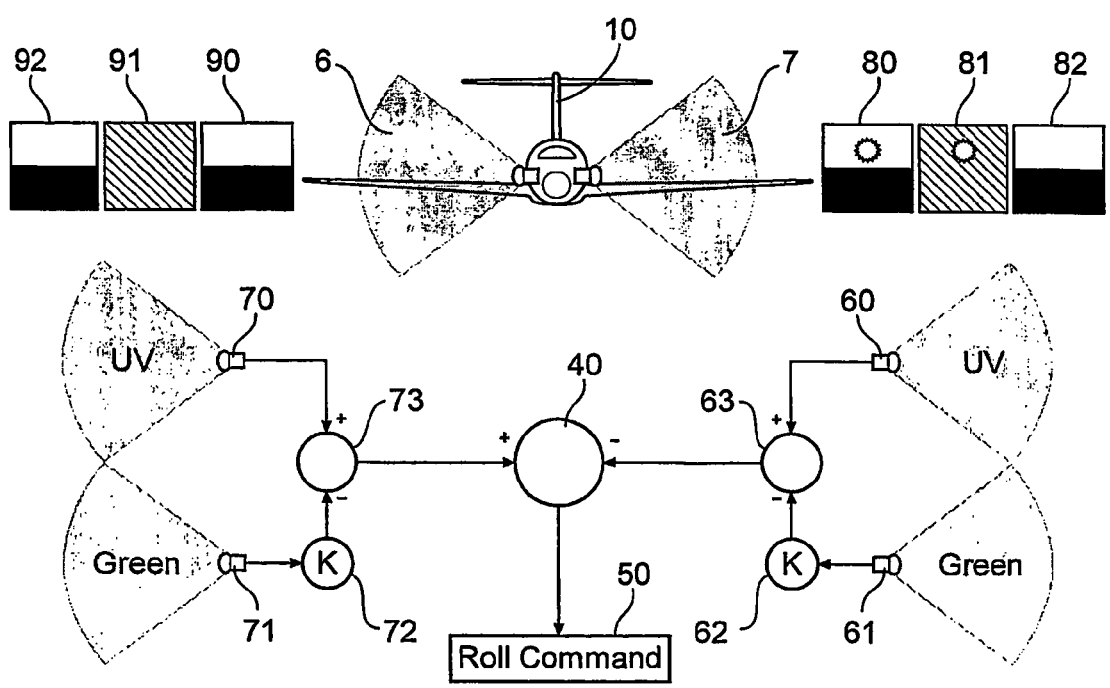
FIG. 4 shows the use of a method according to an embodiment of the present invention to reduce the effect of the sun in the situation of FIG. 3.

Referring now to FIG. 4, there is shown aircraft 10 incorporating a sensor arrangement according to an embodiment of the invention. Viewing the left side of aircraft 10 are UV sensor 60 and green wavelength sensor 61. Similarly viewing the right side of aircraft 10 are UV sensor 70 and green wavelength sensor 71. Each of these sensors has similar lateral fields of view 6, 7 to the single band sensors depicted in FIGS. 1 to 3. Representative views 80 and 81 correspond to measurements from sensors 60 and 61 respectively on the left side of aircraft 10. Representative views 90 and 91 correspond to measurements from sensors 70 and 71 respectively on the right side. As depicted in FIG. 4, the sun is included in the lateral field of view of sensors 60 and 61 viewing the left hand side of the aircraft. In prior art systems such as that illustrated in FIG. 3 this would cause aircraft 10 to roll left.

For both sensors 60 and 61, the sun will be the brightest object in their fields of view. However, UV sensor 60 is highly sensitive to the contrast between the ground and sky 80 whilst the image 81 viewed by green sensor 61 is essentially insensitive to this difference. If an appropriately weighted proportion (factor K) 62 of green sensor 61 output is subtracted 63 from UV sensor 60 output, then the effects of the sun can be substantially reduced resulting in image 82 for the left side. A similar process is effected for the right side of the aircraft resulting in image 92. Processed outputs 63 and 73 corresponding to images 82 and 92 respectively are processed according to a standard roll command system 40, 50.

The value K can be determined in a number of ways. In most situations the value of K can be preset to a constant value with adequate results. Alternatively, K may be varied according to feedback provided another sensor such as a magnetic sensor which would detect any inadvertent heading change caused by unintentional bank angle resulting from an incorrect value of K. Clearly, although in this embodiment weighting by a scalar factor has been envisaged, other modifications to the data set from green sensor 61 which when combined with the output from UV sensor 60 serve to reduce the effects of the sun are contemplated to be within the scope of the invention.

As the effect of the sun has been essentially removed from the roll stabilisation system, the roll bias experienced in prior art systems is substantially reduced thus providing a far more effective attitude control system. Whilst this embodiment has been targeted at removing the effects of the sun, other electromagnetic sources which may produce a bias in the stabilisation system may also be addressed by using suitable sensors which are sensitive to the electromagnetic source but which are relatively insensitive to differences to intensity between the ground and sky at the given wavelength range.

Figure 5:
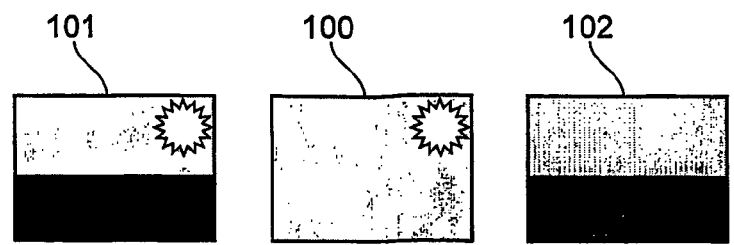
FIG. 5 illustrates the use of image saturation techniques to reduce the effect of the sun in sensed images according to an embodiment of the present invention.

FIG. 5 depicts representative images 100, 101, 102 corresponding to images 80, 81, 82 of FIG. 4 for sensors employing a normal charge coupled device (CCD) or CMOS camera. For these types of devices beneficial use of their saturation characteristics can be employed according to the invention. As in most cases the sun will saturate the imaging devices, driving them beyond their linear range, then the effects of the sun can be removed at the pixel level by subtracting the green sensor 61 image from the UV sensor 60 image assuming that sensors 60, 61 have substantially the same field of view. As the saturation values for both types of sensors are similar, the effect of the sun will be subtracted from resultant image 102 leaving primarily the sky ground contrast.

In the embodiments of the invention discussed thus far, imaging sensors have been employed. However, the invention is equally applicable to non-imaging radiation sensors which may only a have single photosensitive element or alternatively be imaging sensors that are de-focussed to the extent that no image formation occurs. In this instance there is only a single value corresponding to a radiation sensor measurement rather than a data set. Clearly, data from an imaging sensor may also be processed to produce a single value, however full advantage is not then taken of the ability to manipulate data at the pixel level.

A processing advantage is gained if the radiation sensor logarithmically compresses the incoming signal. The advantage of this approach is that each subtraction is equivalent to a division, and thus a ratio. Referring to FIG. 4, at the first level Σ63, 73 in the block diagram, a ratio between ultraviolet and green light is taken, and at the second level Σ40 a ratio of left to right ultraviolet against green contrast is taken. The division process, easily performed using logarithmic processing, eliminates many environmental light level dependent performance changes. An example of such a performance change is that without logarithmic processing, on a day with half the green light, and half the ultraviolet light, the correction signal would be half as much, which is clearly undesirable in a dynamic control system. In the case of imaging sensors, when individual pixels of the array are logarithmically compressed then the sum of the compressed values divided by the number of pixels forms the logarithm of the geometrical mean of the values. The quantity is less sensitive to extreme values the arithmetic mean, and provides an alternative to a saturating nonlinearity.

Figure 6:
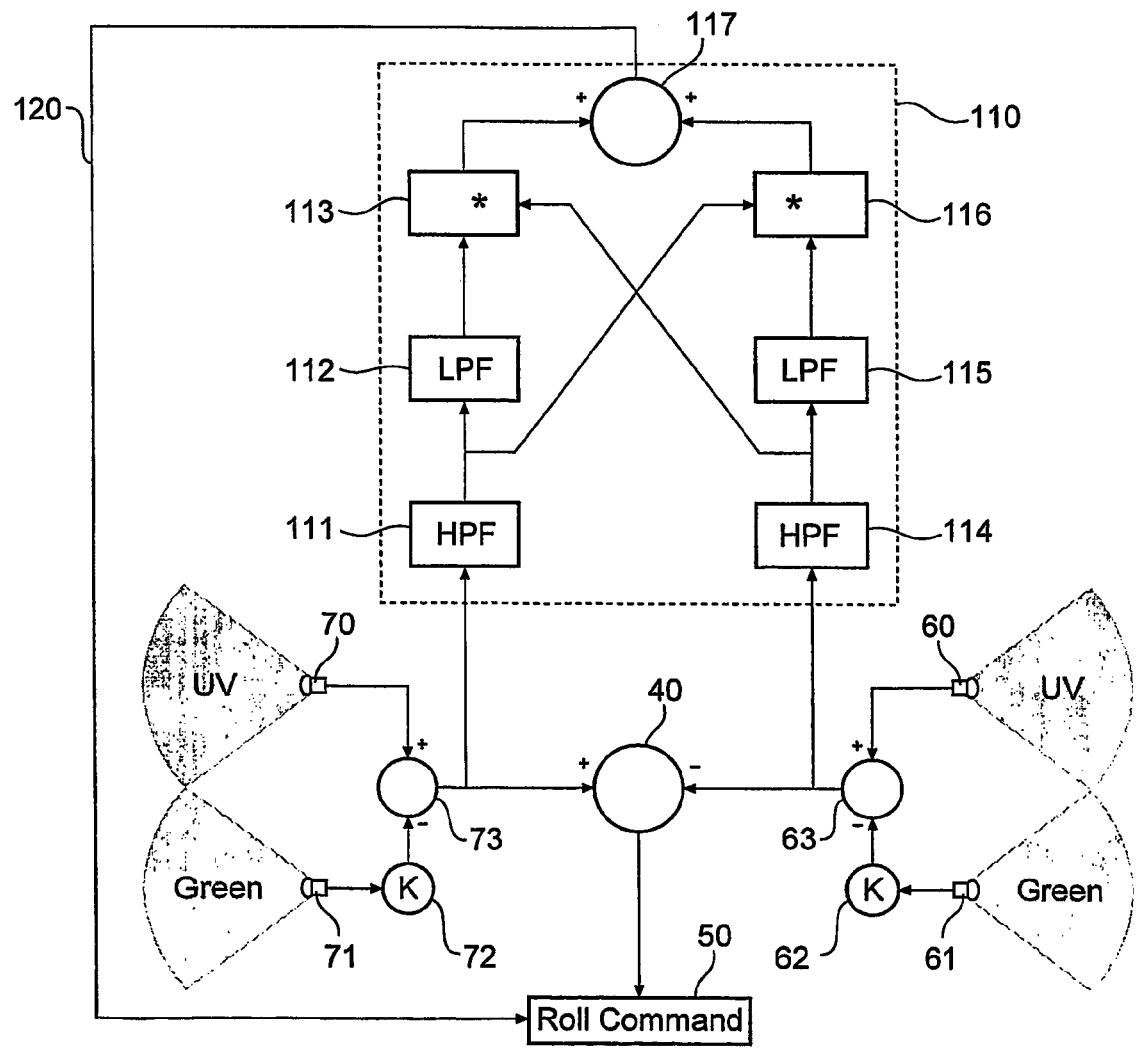
FIG. 6 shows an anti-correlation detection circuit for controlling the attitude of an aircraft.

Referring now to FIG. 6, there is illustrated an embodiment of the present invention which incorporates further features to reduce the effects of horizon asymmetries which become more pronounced during low altitude flight. The compensated left and right signals 82, 92 corresponding to the left and right sides of aircraft 10 (see FIG. 4) are expected to be closely anti-correlated. As the aircraft rolls towards one side, one side of the aircraft will become brighter as the other becomes darker. If signals 82, 92 are not closely anti-correlated then this is due most likely to variations in the horizon between each side. Such variations could be caused, in one example, by sensors on one side of the aircraft viewing the ocean and the other side viewing a mountain range. Clearly, this will present a dynamically-varying bias into the attitude control system.

By introducing anti-correlation detector 110 into the attitude control circuit the effect of horizon asymmetries can be suppressed. In this embodiment a Hassenstien-Reichardt anti-correlation detector is use to measure the relative degree of correlation between processed signals 63, 73 and the associated time delay before correlation.

Anti-correlation detector 110 includes a high pass filtering circuit for each side 111, 114 which allows only the changing part of the signal from one side into the circuit. Each high pass processed signal is low pass filtered 112, 115 yielding a blurred and delayed version of the signal. The low pass filtered signal is multiplied with the corresponding signal from the opposite side 116,113 which will be highest when there is a time delay between raw signals outputs 73, 63 that corresponds to the time constant of the low pass filters 111, 114. Summation of the signals at 117 yields a response signal 120 that will only be strong when there is a delay between left and right light level changes, or when there is no change on one side and a change on the other.

When the signals from the opposed radiation signals are closely anti-correlated detector 110 responds strongly suppressing 120 the roll command 50. The suppression system can allow reduced control inputs to continue to take place in order to prevent other fault conditions arising from unusual horizon configurations or gross illumination asymmetries.

Embodiments of the present invention discussed thus far do not determine the absolute values of vehicle attitude, whether these be roll or pitch, since the attitude stabilisation system only requires the balancing of signals from opposing sides of the vehicle. In any case, changes in sensor signal intensity according to change in attitude will vary according to the prevailing environmental conditions thus making determination of absolute values problematical without further information.

Figure 7:
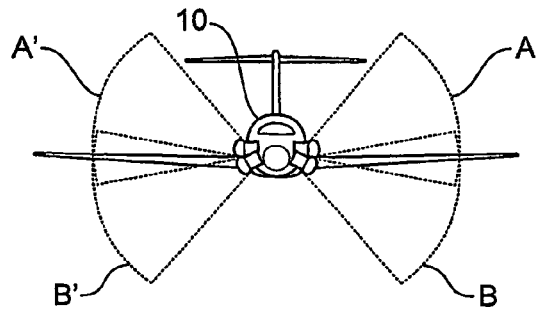
FIG. 7 depicts another embodiment of the present invention having a sensor arrangement employing more radiation detectors to provide angular information.

Referring now to FIG. 7, there is shown another embodiment of the invention which includes the ability to determine absolute angles. In this embodiment an additional pair of sensors in each spectral band is deployed on both sides of aircraft 10. Considering the left side of aircraft 10, radiation sensor pair A consisting of a UV sensor 60 and a green sensor 61 are tilted to have a lateral field of view substantially above the horizon but still viewing in part the ground. Sensor pair B is tilted to have a lateral field of view substantially below the horizon but still viewing in part the sky. This ensures that there are overlapping areas viewed by both sensor pairs. Similarly, on the right side of aircraft 10, sensor pairs A' and B' are deployed. By sampling both above and below the horizon, the gradient of intensity between sky and ground can be determined. Using this information it is possible to compute angular motion, as the ratio of spatial gradient to temporal gradient in intensity levels by calculating the mean intensity difference between A and B (and A' and B') divided by the angular separation between A and B (and A' to B'). Knowing the gradient between sky and ground allows the flight computer to determine angular position from the intensity of light measured by A, A', B or B'. Thus a typical implementation would have four radiation detectors on each side of each axis to be stabilized. However, in another embodiment the number of sensors may be reduced to three, with only an additional radiation sensor in the wavelength where a large gradient in measured sensor intensity is expected.

Figure 8:
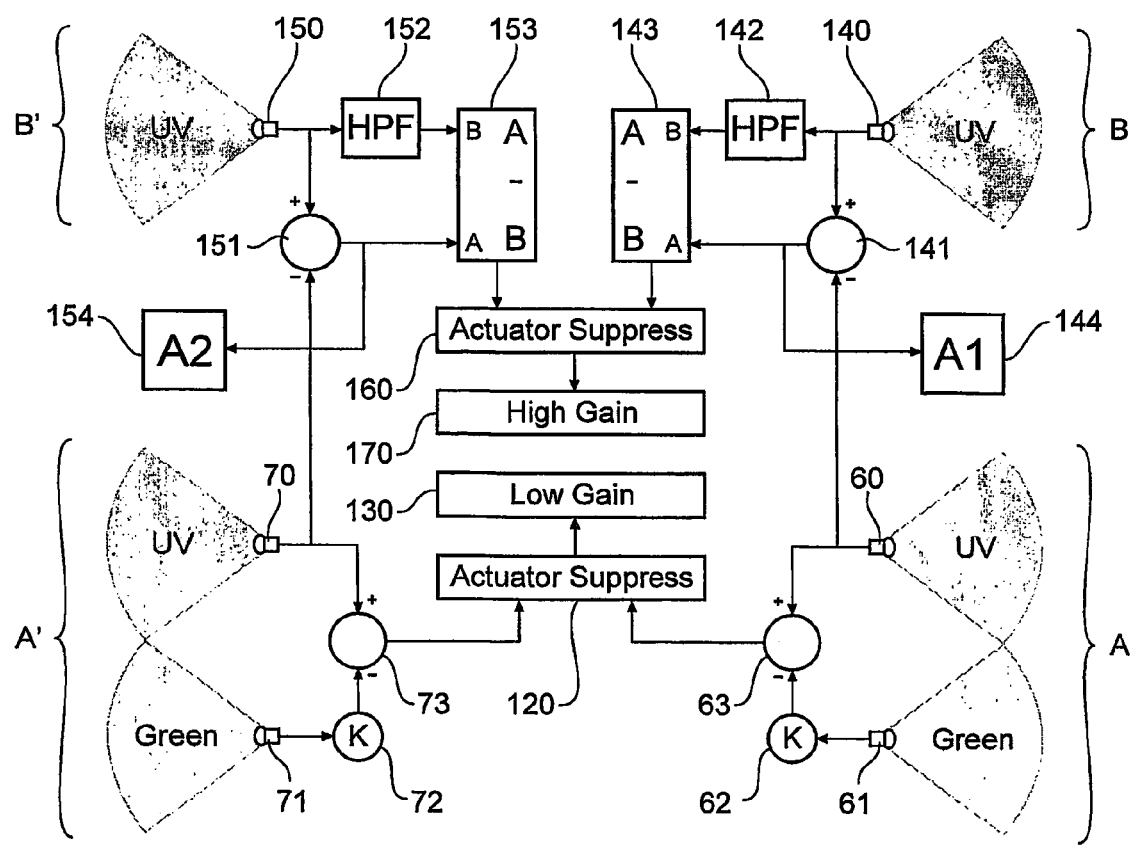
FIG. 8 depicts a circuit according to another embodiment invention employing the sensor arrangement of FIG. 7.

Referring now to FIG. 8, an optical stabilisation system incorporating two UV sensors and a green sensor for each side is shown. Sensor group A and A' are essentially as shown in FIG. 6 containing pairs of UV 60, 70 and green radiation sensors 61, 71 deployed each side of the aircraft and suppression 120 capability based on anti-correlation detection. Secondary UV detectors 140, 150 are oriented towards the ground at a known angle and provide additional data. Considering now the left side of aircraft 10, measured signal from upwards looking UV sensor 60 is subtracted 141 from downwards looking UV sensor 140 signal to calculate the gradient between the ground and sky. This difference value 144 when divided by the angular difference between the directions of the UV sensors provides an absolute measure between angle change and intensity change which is continuously updated. An equivalent value 154 is also calculated for the right side of the aircraft. The optical stabilisation system shown also incorporates high 170 and low 130 rate control similar to that used in control systems that use IMU wherein 170 makes rapid changes in response to motion and 130 makes gradual corrections in response to sustained difference between left and right light levels. Such arrangements have been found to simplify the process of stabilising automatically controlled systems.

This technique would enable the optical stabilization system to perform much of the role of a rate gyroscope about the axis in question. By providing angular velocity information to the flight control system, it becomes less critical that the horizon position control is provided with absolute angular position, since large corrections are made based on accurate angular velocities, while small corrections can be made using light balance.

In another embodiment a roll stabilisation system according to the present invention is mounted on a gimbal having one degree of freedom in the roll direction. In this embodiment the roll stabilisation system acts to hold the gimbal level with the horizon and roll angle is measured from gimbal position. In this case the control surfaces of the aircraft are commanded by the angle of the gimbal, rather than the output of the roll stabilisation system. The use of such a system would also allow the gradient between sky and ground to be adaptively determined by rotating the entire system of the gimbal periodically. This would allow any offset required for banking to be determined accurately and allow for an accurate measure of rate of angular motion in the presence of disturbances thus improving the stabilisation system's ability to reject disturbances. The gimbal could also be put into a standby mode when in level flight using the stabilisation system directly on the aircraft control surfaces as described in previous embodiments of the invention to save power.

Although the present invention has largely been described in terms of roll stabilisation, as this is typically the most critical axis requiring stabilisation, clearly the invention can be equally applied to the correction of pitch angle by incorporating fore and aft sets of appropriate sensors and adopting the methods and systems discussed herein. In the correct circumstances, yaw can also be similarly controlled.

Figure 9:
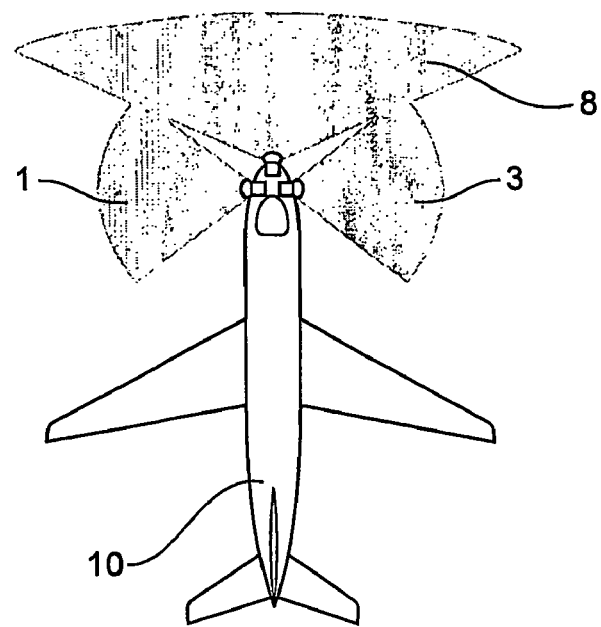
FIG. 9 shows a sensor arrangement on an aircraft with the aft sensor removed.

Referring now to FIG. 9, there is shown a full attitude stabilisation system suitable for both pitch and roll incorporating only three sets of sensors. The field of view of fore sensor 8 is increased in the horizontal direction so that there is significant spatial overlap between this field of view and the two fields of view of the lateral sensors 1, 3. Thus the lateral sensors can be used as the point of reference in determining whether the fore sensor is above or below the horizon by treating the combined signal of the lateral sensors as a virtual aft sensor for comparison. This system is particularly suited to fixed wing aircraft as aft views tend to be dominated by the fuselage or tail plane of the vehicle.

The invention disclosed herein may be used in a number of different implementations. It may be used as a standalone system, in combination with other navigational aids or a backup system which only operates on failure of the main control system. Some of these applications will now be described in more detail.

As a standalone application the present invention is particularly suitable for unstable remotely piloted vehicles such as UAVs. These vehicles which are often relatively small can be impossible to keep upright when piloted by a human especially for long periods in the presence of gusts and at high speed. The addition of an optical stabilisation system according to the present invention would prevent the aircraft from tipping over in flight and reject most gusts allowing a lower crash rate. It will also be appreciated that the necessary calculations may be done remotely, with sensor data being telemetered from the vehicle to a ground based processor and then resultant control signals transmitted in turn to the vehicle.

Figure 10:
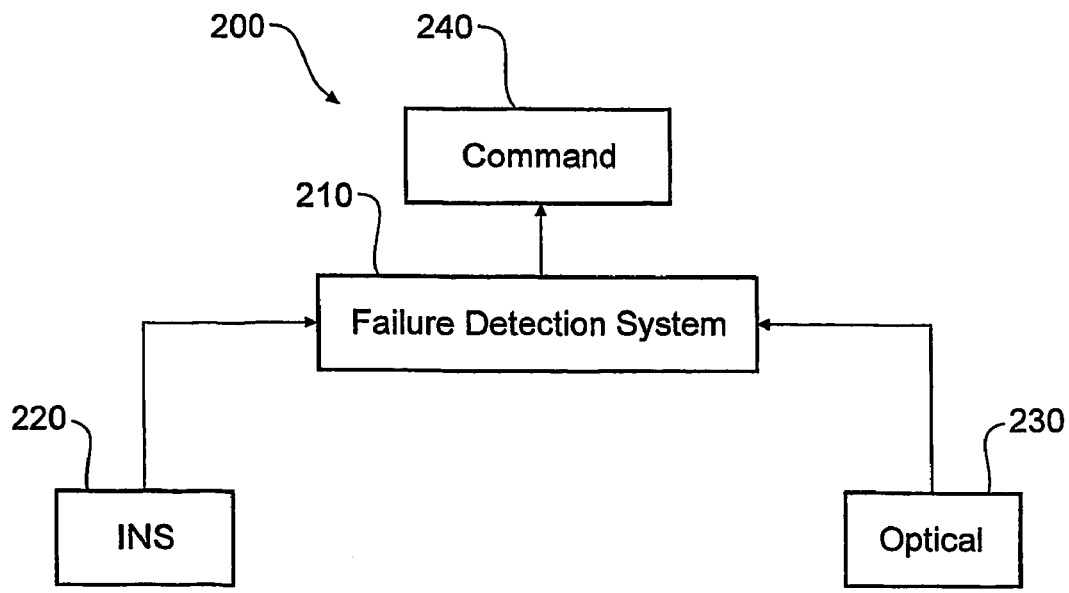
FIG. 10 depicts an embodiment of the invention being employed as a backup system to a standard Inertial Navigation System (INS)

FIG. 10 illustrates a navigation and control system 200 incorporating the present invention to be used in the event of failure of the primary Inertial Navigation System (INS) 220. Many INS systems contain automatic self test systems which are periodically sequenced to detect faults, they do not however indicate what should happen after detection of a major fault. In standard operation the INS 220 will provide all navigation and control functionality. When the failure detection system 210 detects an INS 220 problem, outputs from the optical stabilisation system 230 are used. The amount of reliance on the optical system 230 can be staged according to the severity of the fault in the INS 220.

Figure 11:
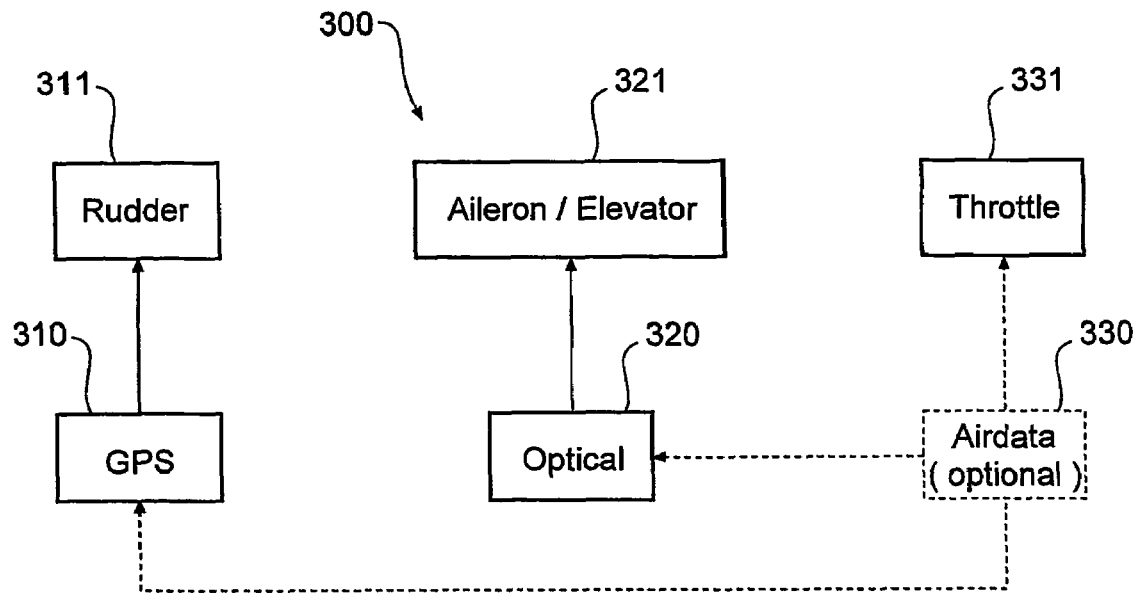
FIG. 11 shows an embodiment of the present invention being used in combination with a standard GPS system.

FIG. 11 illustrates a combined direction and control system 300 having all the essential features of an IMU incorporating a Global Positioning System (GPS) 310 to provide heading and location acting in combination with an optical stabilisation system 320 according to the present invention which provides the attitude information. Ailerons and elevator 321 can be used simply to hold the craft upright and level while rudder 311 performs the steering for navigation. In those circumstances where a rudder 311 is not incorporated in the aircraft such as in many UAVs, knowledge of the dependence of heading change on bank angle as provided by the optical stabilisation system 320 will allow navigation of the aircraft by the aileron and elevator 321.

Figure 12:
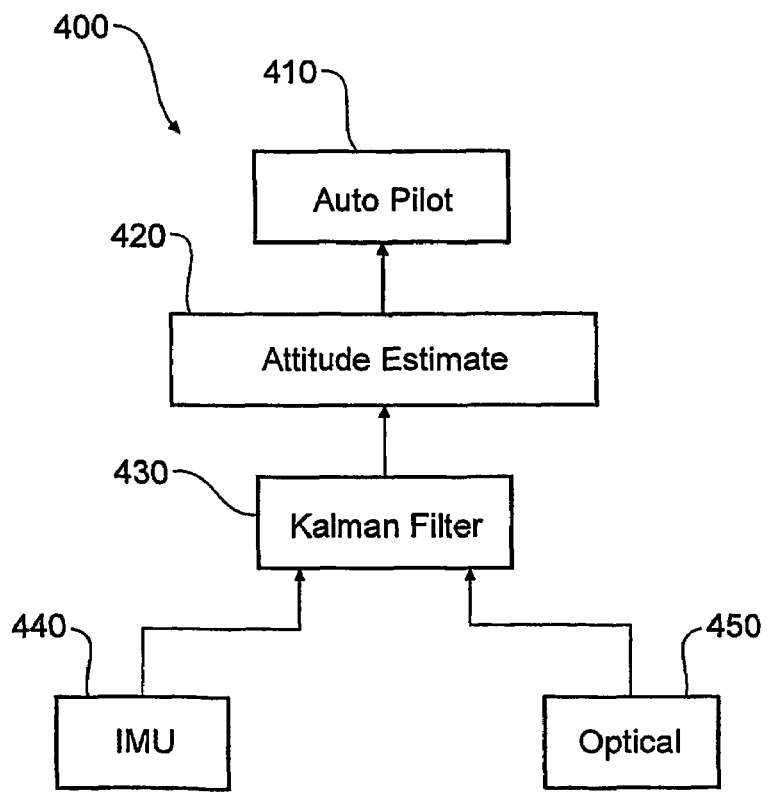
FIG. 12 shows a combination navigation system consisting of an IMU and an optical stabilisation system according to an embodiment of the invention.

FIG. 12 illustrates use of an optical stabilisation system 450 according to the present invention in a complete autopilot system 400 incorporating a low cost IMU 440. As the stabilisation system 450 is unaffected by aircraft accelerations, a low cost IMU may be used. The implementation of these techniques would require the use of Kalman filters 430, extended Kalman filters, or similar optimal filters, in order to adapt in flight to changes in the environment and combine measurements from external navigation references with measured changes in light distribution. Using these techniques the performance of the IMU 440 and stabilisation system 450 would be higher than that obtained for either sensor operating individually.

Although a preferred embodiment of the method and apparatus of the present invention has been illustrated in the accompanying drawings and described in the foregoing detailed description, it will be understood that the invention is not limited to the embodiments disclosed, but is capable of numerous rearrangements, modifications and substitutions without departing from the scope of the invention as set forth and defined by the following claims.

The claims defining the invention are as follows:

1. A method for controlling an attitude of a vehicle in a space having at least two opposed viewable regions about said vehicle, each region being viewed by a respective first sensor which senses radiation in a first frequency band of electromagnetic radiation and a respective second sensor which senses radiation in a second different frequency band of electromagnetic radiation, said method including the steps of:
   a) producing a first data set from said first sensor viewing a first of said regions;
   b) producing a second data set from said second sensor viewing said first region;
   c) modifying said second data set;
   d) combining the result of said modifying step with said first data set to form a third data set for said first region;
   e) repeating steps a) to d) for a second set of first and second sensors viewing an opposed viewable region; and
   f) adjusting the attitude of said vehicle until respective said third data sets for each opposed viewable region are substantially equal.

2. A method for controlling an attitude of a vehicle as claimed in claim 1, wherein said steps of modifying and combining reduce a bias introduced by a source of electromagnetic radiation in a viewable region.

3. A method for controlling an attitude of a vehicle as claimed in claim 2, wherein measurements by each of said second sensors in said second frequency band are substantially sensitive to said electromagnetic source and relatively insensitive to intensity differences between the sky and ground in said second frequency band.

4. A method for controlling the attitude of a vehicle as claimed in claim 2, wherein said sensors are imaging sensors and said data sets produced from said sensors correspond to measurements made for each pixel of each of said imaging sensors, said imaging sensors furthermore adjusted to be substantially saturated by said electromagnetic source, wherein said step of modifying includes determining a subset of said first data set corresponding to said saturated pixels in said first data set from said first sensor and said step of subtracting includes removing an equivalent subset of data from the second data set data from said second sensor to form said third data set.

5. A method as claimed in claim 1, wherein said step of modifying includes multiplying said second data set by a predetermined factor.

6. A method for controlling an attitude of a vehicle as claimed in claim 1, wherein said step of combining includes subtracting said result of said modifying step from said first data set.

7. A method for controlling the attitude of a vehicle as claimed in claim 1, wherein said steps of producing first and second data sets further each includes the step of logarithmically compressing said data sets.

8. A method for controlling an attitude of a vehicle as claimed in claim 1 further including the steps of:
   g) calculating an anti-correlation value for each of said respective third data sets, and
   h) reducing the adjusting if said anti-correlation value is low.

9. A method for controlling an attitude of a vehicle as claimed in claim 8, wherein said anti-correlation value is calculated by determining the complement of a Hassenstien-Reichardt correlation detector.

10. A method for controlling an attitude of a vehicle as claimed in claim 1, wherein said first frequency band of electromagnetic radiation is in the ultraviolet frequencies and said second frequency band is in the green spectra frequencies and a source of the electromagnetic radiation is the sun.

11. A method for controlling an attitude of a vehicle as claimed in claim 1, wherein at least of one said first and second frequency bands corresponds to the mm wavelength band.

12. A method for controlling an attitude of a vehicle as claimed in claim 1, wherein said opposed viewable regions are to the left and right of said vehicle and the attitude of the vehicle which is controlled is roll.

13. A method for controlling an attitude of a vehicle as claimed in claim 1, wherein said opposed viewable regions are fore and aft of said vehicle and the attitude of the vehicle which is controlled is pitch.

14. A method for controlling an attitude of a vehicle as claimed in claim 1, wherein said opposed viewable regions are to the left and right of said vehicle and to the fore and aft of said vehicle respectively and both vehicle roll and pitch are controlled.

15. A method for controlling an attitude of a vehicle as claimed in claim 14, wherein said first and second data sets corresponding to the aft viewable region are generated by modifying and combining respective first and second data sets from said left and right viewable regions thereby eliminating the requirement for sensors viewing said aft region.

16. A vehicle whose attitude is being controlled according to the method of claim 1.

17. A method for calculating the attitude of a vehicle in a space having a viewable region, said region being viewed by a first and second pair of sensors, each of said first and second pairs including a first sensor which senses radiation in a first frequency band of electromagnetic radiation and a second sensor which senses radiation in a second different frequency band of electromagnetic radiation, said first pair of sensors being tilted a first predetermined angle to view a first sub-region substantially above and including a horizon between the ground and sky, and said second pair of sensors being tilted a second predetermined angle to view a second sub-region substantially below and including the horizon; the method including the steps of:
   a) producing a first data set from said first sensor of said first pair;
   b) producing a second data set from said second sensor of said first pair;
   c) modifying said second data set;
   d) combining the result of said modifying step with said first data set to form a third data set for said first pair;
   e) repeating steps a) to d) for said first and second sensors of said second pair;
   f) determining a relationship between a change in intensity between said third data sets and said vehicle attitude; and
   g) calculating said vehicle attitude from said relationship.

18. A method for calculating the attitude of a vehicle as claimed in claim 17, wherein said step of determining includes calculating an angular difference between said first and second predetermined angles.

19. A method for calculating the attitude of a vehicle as claimed in claim 17, further including the step of calculating the rate of change of vehicle attitude.

20. A method for calculating the attitude of a vehicle as claimed in claim 17, wherein said steps of modifying and combining reduce an intensity bias introduced by a source of the electromagnetic radiation in said viewable region.

21. A method for calculating the attitude of a vehicle as claimed in claim 20, wherein measurements by each of said second sensors of each pair in said second frequency band are substantially sensitive to said electromagnetic source and relatively insensitive to intensity differences between the sky and ground in said second frequency band.

22. A method for calculating the attitude of a vehicle as claimed in claim 21, wherein the first band of electromagnetic radiation is in the ultraviolet frequencies and the second band is in the green spectra frequencies and the source of electromagnetic radiation is the sun.

23. A method for calculating the attitude of a vehicle as claimed in claim 21, wherein at least of one said first and second frequency bands is in the mm band of frequencies.

24. A method for calculating the attitude of a vehicle as claimed in claim 17, wherein said viewable region is to the left or right of said vehicle and said vehicle roll is determined.

25. A method for calculating the attitude of a vehicle as claimed in claim 17, wherein said viewable region is to the fore or aft of said vehicle and said vehicle pitch is determined.

26. An apparatus for controlling an attitude of a vehicle in a space having at least two opposed viewable regions about said vehicle, said apparatus including for viewing each region, a respective first sensor which senses radiation in a first frequency band of electromagnetic radiation and a respective second sensor which senses radiation in a second different frequency band of electromagnetic radiation, said apparatus further including:
- a) respective first means for producing first data sets from said first sensors viewing each of said regions;
- b) respective second means for producing second data sets from said second sensors viewing each of said regions;
- c) respective third means for modifying each of said second data sets;
- d) respective fourth means for combining the results of each of said third means with said first data sets to form respective third data sets for each of said regions; and
- e) fifth means for generating a control signal to adjust the attitude of said vehicle until respective said third data sets for each opposed viewable region are substantially equal.

27. An apparatus for controlling an attitude of a vehicle as claimed in claim 26, wherein said respective third and fourth means act to reduce a bias introduced by a source of electromagnetic radiation in a viewable region.

28. An apparatus for controlling an attitude of a vehicle as claimed in claim 26, wherein measurements by each of said second sensors in said second frequency band are substantially sensitive to said electromagnetic source and relatively insensitive to intensity differences between the sky and ground in said second frequency band.

29. An apparatus as claimed in claim 26, wherein said respective third means multiply said second data set by a predetermined factor.

30. An apparatus for controlling an attitude of a vehicle as claimed in claim 26, wherein said respective fourth means subtracts the result of said third means from said first data set.

31. An apparatus for controlling an attitude of a vehicle as claimed in claim 26, further including:
- f) sixth means for calculating an anti-correlation value for each of said respective third data sets, and
- g) seventh means to reduce the effect of said control signal if said anti-correlation value is low.

32. An apparatus for controlling an attitude of a vehicle as claimed in claim 26, wherein said first frequency band of electromagnetic radiation is in the ultraviolet frequencies and said second frequency band is in the green spectra frequencies and the source of electromagnetic radiation is the sun.

33. An apparatus for controlling an attitude of a vehicle as claimed in claim 26, wherein at least of one said first and second frequency bands corresponds to the mm wavelength band.

34. An apparatus for calculating the attitude of a vehicle in a space having a viewable region, said apparatus including for viewing said region, a first and second pair of sensors, each of first and second pair including a first sensor which senses radiation in a first frequency band of electromagnetic radiation and a second sensor which senses radiation in a second different frequency band of electromagnetic radiation, said first pair of sensors adapted to be tilted a first predetermined angle to view a first sub-region substantially above and including a horizon between the ground and sky, and said second pair of sensors adapted to be tilted a second predetermined angle to view a second sub-region substantially below and including the horizon; said apparatus further including:
- a) respective first means for producing respective first data sets from said first sensors of each pair;
- b) respective second means producing second data sets from said second sensors of each first pair;
- c) respective third means for modifying each of said second data sets;
- d) respective fourth means for combining the results of each of said third means with said first data sets to form respective third data sets for each pair of sensors;
- e) fifth means for determining a relationship between change in intensity between said third data sets and vehicle attitude; and
- f) sixth means to calculate said vehicle attitude according to said relationship.

35. An apparatus for calculating the attitude of a vehicle as claimed in claim 34, wherein said sixth means further calculates the rate of change of vehicle attitude.

36. An apparatus for calculating the attitude of a vehicle as claimed in claim 34, wherein said respective third and fourth means act to reduce a bias introduced by a source of electromagnetic radiation in said viewable region.

37. An apparatus for calculating the attitude of a vehicle as claimed in claim 34, wherein measurements by each of said second sensors of each pair in said second frequency band are substantially sensitive to said electromagnetic source and relatively insensitive to intensity differences between the sky and ground in said second frequency band.

38. An apparatus for calculating the attitude of a vehicle as claimed in claim 37, wherein the first band of electromagnetic radiation is in the ultraviolet frequencies and the second band is in the green spectra frequencies and the source of electromagnetic radiation is the sun.

39. An apparatus for calculating the attitude of a vehicle as claimed in claim 37, wherein at least of one said first and second frequency bands corresponds to the mm wavelength band.

40. A method for controlling an attitude of a vehicle said method including the steps of:
- a) taking a first measurement of intensity of electromagnetic radiation in a first spectral band;
- b) taking a second measurement of intensity of electromagnetic radiation in a second different spectral band;
- c) processing said first and second measurements together; and
- d) producing a control signal as a result of said processing step to control said attitude of said vehicle.

41. A method for controlling the attitude of a vehicle as claimed in claim 40, wherein said processing includes filtering and multiplying to combine said first and second measurements.

42. An apparatus for controlling an attitude of a vehicle, said apparatus including:
- a) a first sensor for taking a first measurement of intensity of electromagnetic radiation in a first spectral band;
- b) a second sensor for taking a second measurement of intensity of electromagnetic radiation in a second different spectral band;
- c) a processor for processing said first and second measurements together; and
- d) a control signal generator responsive to said processor for producing a control signal to control said attitude of said vehicle.

43. An apparatus for controlling an attitude of a vehicle as claimed in claim 42, wherein said processing includes filtering and multiplying to combine said first and second measurements.

* * * * *

UNITED STATES PATENT AND TRADEMARK OFFICE
CERTIFICATE OF CORRECTION

PATENT NO. : 7,593,794 B2  Page 1 of 1
APPLICATION NO. : 10/521676
DATED : September 22, 2009
INVENTOR(S) : Chahl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1017 days.

Signed and Sealed this

Fourteenth Day of December, 2010

David J. Kappos
*Director of the United States Patent and Trademark Office*